(No Model.)

J. F. HORNBERGER.
DEVICE FOR STEAMING COFFEE, TEA, &c.

No. 530,308. Patented Dec. 4, 1894.

Attest:
Henry Appleton
K. Smith

Inventor:
John F. Hornberger
per Wm. Hubbell Fisher,
Attorney.

UNITED STATES PATENT OFFICE.

JOHN F. HORNBERGER, OF LAWRENCEBURG, INDIANA.

DEVICE FOR STEAMING COFFEE, TEA, &c.

SPECIFICATION forming part of Letters Patent No. 530,308, dated December 4, 1894.

Application filed April 14, 1892. Serial No. 429,167. (No model.)

*To all whom it may concern:*

Be it known that I, JOHN F. HORNBERGER, a citizen of the United States of America, and a resident of the city of Lawrenceburg, in the county of Dearborn and State of Indiana, have invented certain new and useful Improvements in Devices for Steaming Coffee, Tea, &c., of which the following is a specification.

The object of my invention is to provide a cheap and convenient device, which will enable coffee or tea or a like article to be steamed in a common coffee or tea pot, as the case may be.

The pots now used for the steaming of coffee are for the most part of complicated construction and all of them are expensive.

My invention enables me to utilize a common pot for the purpose of steaming the coffee or other material out of which the decoction is to be made.

Another advantage of my invention is that when desired, the device which I combine with the ordinary pot, in order to render the latter capable of steaming the coffee may be immediately removed from the pot and the latter used for any other purposes desired.

Still another advantage arising from the use of my invention is the facility with which the various parts thereof may be cleansed. Furthermore, all of the parts may be easily, quickly and cheaply repaired.

Figure 1:
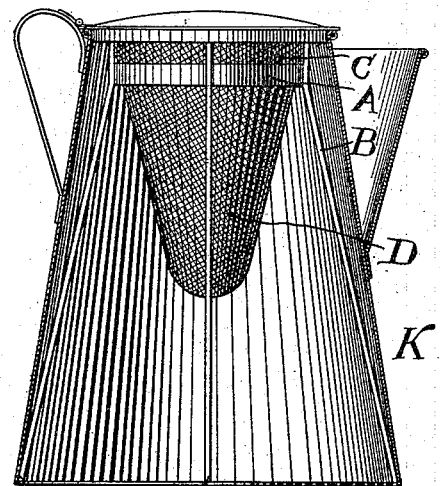
Figure 2:
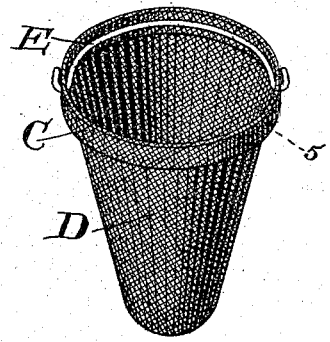
Figure 4:
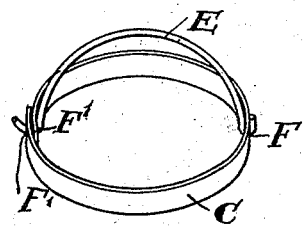
Figure 5:
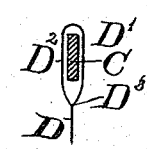
Figure 3:
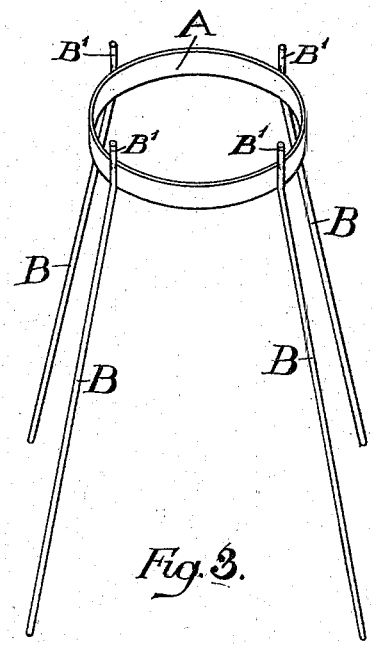

In the accompanying drawings, making a part of this specification, and to which reference is hereby made,—Figure 1 represents a vertical central section of a pot and showing within in elevation an apparatus or device embodying my invention. Fig. 2 is a view in perspective of the straining bag or receptacle, and shows combined therewith that portion of my invention which is directly connected to the said straining cloth or bag. Fig. 3 is a view in perspective of the device to which the bag is directly connected. Fig. 4 is a perspective view of a device for supporting the straining bag and its frame and bail within the pot. Fig. 5 is a transverse section of the annular frame for supporting the straining bag, and of that portion of the bag which surrounds the frame and is in the immediate vicinity of the frame. This section is taken in the plane of the dotted line 5 of Fig. 2.

A indicates a ring. This ring is provided with three or more legs B. The ring is located in the vicinity of the upper ends of the legs. The legs are laterally elastic, and are made out of spring metal, preferably of spring rod or wire.

C is a ring so constructed that when placed over the ring A, it cannot slip through it. A convenient mode of having it accomplish this object, is by making it of a diameter equal to or greater than the diameter of the ring A. Preferably I make the rings A and C of the same diameter. This upper ring C is provided with a bail or handle E, connected to the ring C in some suitable manner.

In order to utilize the entire space within the coffee or other pot, during the operation of steaming hereinafter mentioned, it is desirable that the handle be pivotally connected to the ring C so that it (the handle) can be laid down against the said ring, out of the way when the cover is to be placed on the coffee pot.

A novel, convenient and useful mode of uniting the handle to the ring, and at the same time of uniting together the adjacent ends of the ring when the latter is formed out of a flat strip of metal, is as follows:—The ring is perforated at F, viz: at its mid length and also at the ends at F', F'. One end of the handle E is passed through opening F and is bent or otherwise fixed so that it cannot return through the said opening, and is yet free to turn therein. The other end of the handle E is passed through the openings F', F' in the ends of the ring C, and is then bent, or so fixed as to be permitted to turn therein and not to slip out therefrom. To this ring is attached the upper end of a perforated receptacle D, for straining the article out of which the decoction is to be made, and also whereby said article may be steamed. This receptacle is preferably made as shown, of a suitable textile fabric, sufficient to prevent the ground coffee or tea from passing through, and at the same time allow water to pass through from within and steam to pass through from the outside of the said receptacle D.

A preferred mode of attaching the strainer is as shown, viz: by sewing a hem at the top of the strainer, as indicated in Fig. 5, where $D^3$ represents the line of the seam and $D'$ $D^2$ respectively indicate the two sides of the hem. In applying this strainer thus sewed to the ring C, the ends of the ring C are separated. When they are connected as shown in the drawings, the end of the handle is bent so that it can be temporarily withdrawn from the said end of the ring. The end of the ring C is now introduced into the hem and the strainer slipped on over the ring. The ends of the ring are now secured together by the end of the handle in the manner heretofore mentioned.

In order that the ring C may remain in place, when placed upon the ring A as hereinafter specified, the latter ring A is provided with projections or guards B', which project upward and above it. A novel and convenient mode of providing these projections consist in fastening the legs B on the outer side of the ring A and in extending the upper portions of the legs B up beyond the upper rim of the ring A, substantially as shown.

The mode in which my invention is, in general, operated, is as follows:—The lower ends of the legs B are brought together enough to allow them to be simultaneously inserted through the mouth of the coffee or other pot. The device is then altogether inserted in the said pot. The elastic legs B being free from pressure will, so far as possible, resume their original position, substantially as shown in Fig. 1. Their lower ends will then press against the sides of the pot at the bottom of the latter, and will hold themselves and the ring A firmly in position. It will thus be evident that the ring A need not fit the pot, but can be as much smaller as desired, and yet be held firmly in the proper position.

The ring A may be near the upper edge of the pot K, there being space enough left above said ring A and below the top of the pot for the height of the ring C carrying the straining and steaming bag D. The handle is now moved over and laid down out of the way.

A suitable quantity of the coffee, or tea, or herb to be steamed is then placed in the strainer or straining bag D, and the latter is passed through the ring A down into the pot, until the ring C is between the guards B' and rests upon the supporting ring A. Water is then poured into the strainer and saturates the coffee or other article to be steamed and also passes into the pot. The amount of water to be placed in the pot depends upon the wish of the user. The water is then heated to a boiling point and the coffee is then allowed to be steamed for a suitable time, and the beverage is then ready to be served.

When all of the virtue of the coffee has been utilized, the strainer and steaming bag D is withdrawn, and the old coffee taken from it. The bag is then cleansed and is ready for future use as heretofore specified.

While the bag is withdrawn, the supporting device consisting of the ring A and its legs B, B, B, remains in the pot, and will continue to be left there until the pot is to be cleaned or is to be used for other purposes.

What I claim as new and of my invention, and desire to secure by Letters Patent, is—

1. A device consisting of the elastic legs B, and ring A, connected thereto and straining bag D having ring C, at its upper end or mouth, the ring being formed of a strip or piece bent into form and having each of its meeting edges provided with an orifice through which one end of the bail is passed and bent, the other end of the bail E being connected to the other side of the ring, substantially as and for the purposes specified.

2. A device consisting of the elastic legs B, and ring A, connected to the legs, the ends B' of the legs B projecting upwardly above the ring A, and the adjustable, removable ring C carrying bag D, and adapted to rest on ring A between the said guards B', substantially as and for the purposes specified.

3. A device consisting of the elastic legs B, and ring A, connected to the legs, the ends B' of the legs B projecting upwardly above the ring A, and the ring C carrying bag D, and adapted to rest on ring A between the said guards B', and bail E, substantially as and for the purposes specified.

JOHN F. HORNBERGER.

Attest:
WM. E. JONES,
K. SMITH.